United States Patent [19]
Hsu et al.

[11] Patent Number: 5,857,875
[45] Date of Patent: Jan. 12, 1999

[54] MULTI-OUTLET ELECTRICAL ADAPTER

[76] Inventors: I-Ching Hsu; I Cheng Hsu, both of No. 6, Nan-Kung Rd, Chung Ho City, Taipei Hsien, Taiwan

[21] Appl. No.: 780,445

[22] Filed: Jan. 8, 1997

[51] Int. Cl.[6] .................................................. H01R 25/00
[52] U.S. Cl. .............................................................. 439/652
[58] Field of Search ................................... 439/652, 654, 439/650

[56] References Cited

U.S. PATENT DOCUMENTS 4,659,161   4/1987   Holcomb ................................. 439/652

*Primary Examiner*—Khiem Nguyen
*Assistant Examiner*—Eugene G. Byrd
*Attorney, Agent, or Firm*—Bacon & Thomas, PLLC

[57] ABSTRACT

A multi-outlet electrical adapter having a plug unit at one side adapted for connecting to a power outlet socket of a computer mainframe, an electrical outlet adapted for receiving an electrical plug of an electrical cable of a computer peripheral equipment, and one receptacle unit disposed at a second side, the receptacle unit and the receptacle unit being so designed that a plurality of multi-outlet electrical adapters can be connected together by connecting the plug unit of one multi-outlet electrical adapter to the receptacle unit of another.

2 Claims, 3 Drawing Sheets

MULTI-OUTLET ELECTRICAL ADAPTER

BACKGROUND OF THE INVENTION

The present invention relates to electrical adapters, and more specifically to a multi-outlet electrical adapter adapted for mounting on a power outlet socket of a computer mainframe to provide power supply to multiple peripheral equipment connected thereto.

Because a computer mainframe has only one power supply output port for the connection of for example a monitor, an extension cable may have to be used when to connect a plurality of computer peripheral equipment to a computer mainframe. As illustrated in FIG. 1, the power supply input port of the monitor 101 is connected to the power supply output port of the computer mainframe 100, the power supply input ports of the computer mainframe 100, speaker 102 and modem 103 are respectively connected to the outlets of an extension cable 104. When in use, the computer mainframe 100, the speaker 102 and the modem 103 shall have to be respectively turned on. When not in use, the computer mainframe 100, the speaker 102 and the modem 103 shall have to be respectively turned off. If forget to turn off the computer peripheral equipment after an use, electrical power supply will be wasted. Furthermore, the power cables of the computer peripheral equipment may be tangled.

SUMMARY OF THE INVENTION

The present invention has been accomplished to provide a multi-outlet electrical adapter which eliminates the aforesaid problems. According to the present invention, the multi-outlet electrical adapter comprises a plug unit and one side adapted for connecting to a power outlet socket of a computer mainframe, an electrical outlet adapted for receiving an electrical plug of an electrical cable of a computer peripheral equipment, and one receptacle unit disposed at a second side. The receptacle unit and the receptacle unit are so designed that a plurality of multi-outlet electrical adapters can be connected together by connecting the plug unit of one multi-outlet electrical adapter to the receptacle unit of another, and therefore a plurality of computer periphery equipment can be simultaneously connected to the power supply outlet port of a computer mainframe to receive power supply from it.

DETAILED DESCRIPTION OF THE PREFERRED EMBODIMENT

Figure 1:
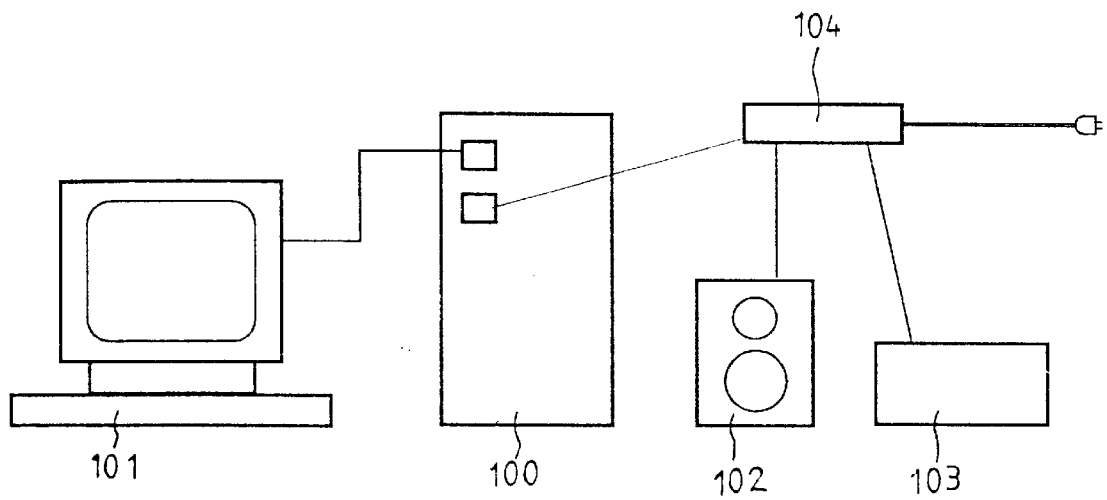
FIG. 1 shows the power line arrangement between a computer mainframe and a plurality of peripheral equipment according to the prior art.
Figure 2:
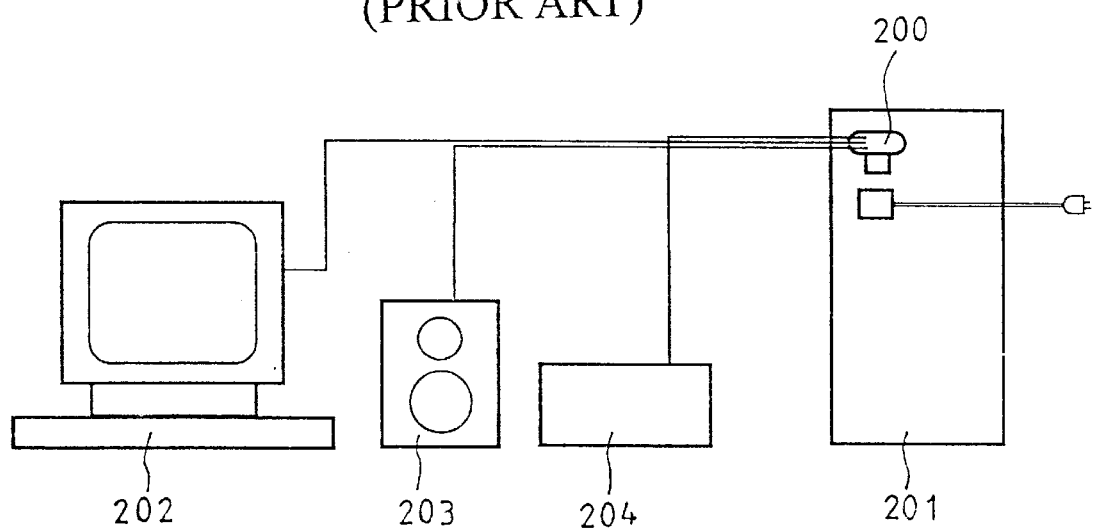
FIG. 2 shows the power line arrangement between a compute mainframe and a plurality of peripheral equipment according to the present invention.

Referring to FIG. 2, the multi-outlet electrical adapter, referenced by 200, is mounted on a power outlet socket of a computer mainframe 201, a monitor 202, a speaker 203 and a modem 204 are respectively connected to the multi-outlet electrical adapter 200 to receive power supply from the computer mainframe 201. When the power switch of the computer mainframe 201 is switched off, the monitor 202, the speaker 203 and the modem 204 are simultaneously turned off.

Figure 3:
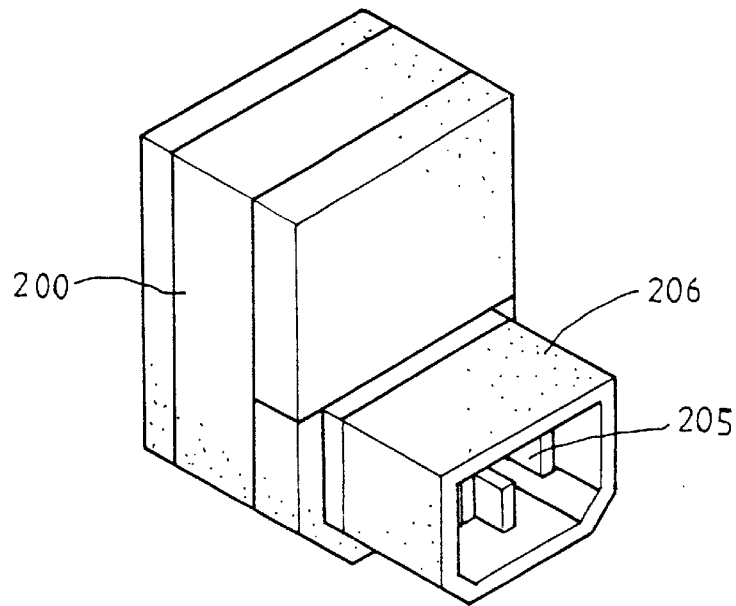
FIG. 3 is an elevational rear side view of a multi-outlet electrical adapter according to the present invention.
Figure 4:
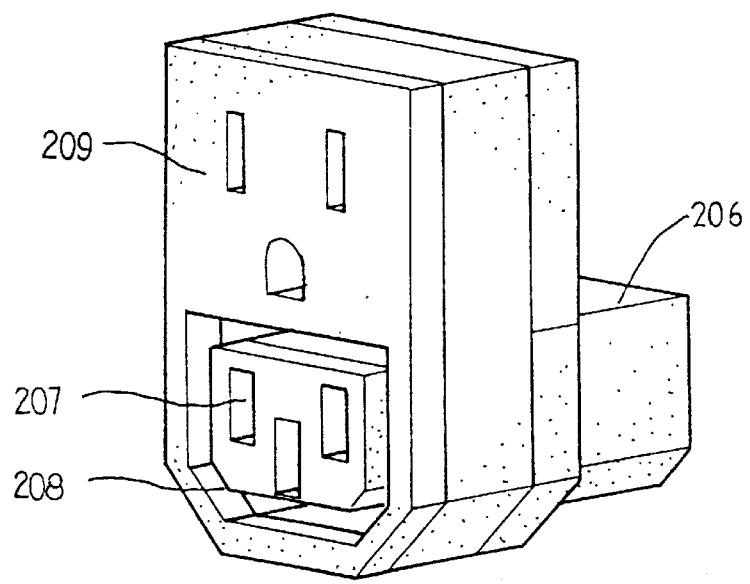
FIG. 4 is an elevational front side view of the multi-outlet electrical adapter shown in FIG. 3.

Referring to FIGS. 3 and 4, the multi-outlet electrical adapter 200 comprises a plug 206 with blades 205 at the back side adapted for fastening to the power outlet socket of the computer mainframe, one electrical outlet 209 adapted for receiving an electrical plug of an electrical cable of a peripheral equipment, and one receptacle unit 207 disposed at for example the front side and surrounded by a groove 208. The design of the groove 208 around the receptacle unit 207 permits the plug 206 of a first multi-outlet electrical adapter to be electrically connected to the receptacle unit 207 of a second multi-outlet electrical adapter.

Figure 5:
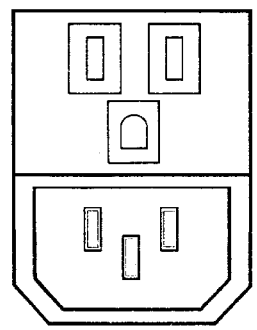
FIG. 5 shows multi-outlet electrical adapters connected into different forms according to the present invention.
Figure 5:
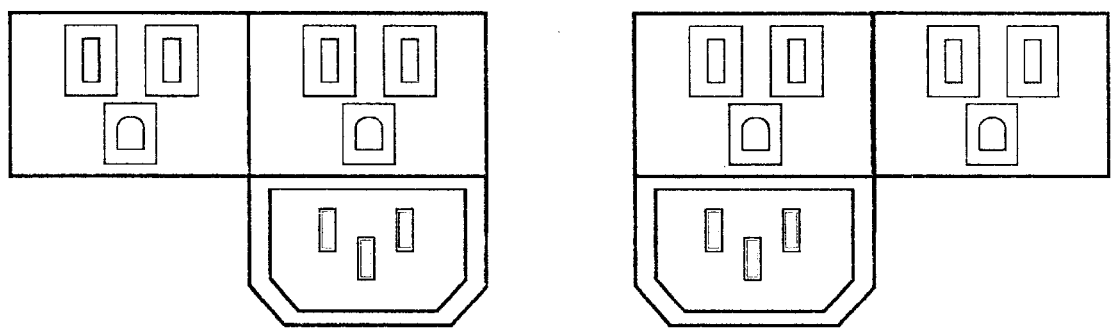
Figure 5:
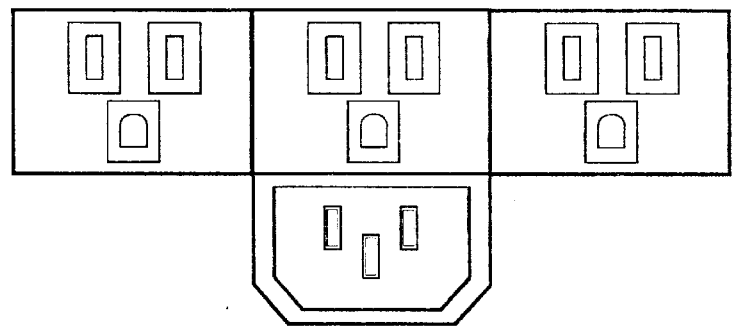

Referring to FIG. 5 and FIGS. 3 and 4 again, the receptacle unit 207 can be designed at the front, left, right, top or bottom side, so that a plurality of multi-outlet electrical adapters can be connected into any of a variety of forms as shown in FIG. 5.

It is to be understood that the drawings are designed for purposes of illustration only, and are not intended as a definition of the limits and scope of the invention disclosed.

What the invention claimed is:

1. A multi-outlet electrical adapter comprising:
   a plug unit at one side adapted to be connected to a power outlet socket of a computer mainframe;
   an electrical outlet adapted for receiving an electrical plug of an electrical cable of a computer peripheral equipment, said electrical outlet being connected to said plug unit by electrical conductors arranged to receive electrical power from said plug unit and supply it to said electrical outlet; and
   one receptacle unit disposed at a second side and surrounded by a groove, said receptacle unit being connected to said plug unit by additional electrical conductors arranged to receive electrical power from said plug unit and supply it to said receptacle unit, the size of said plug unit fitting said receptacle unit so that a plurality of multi-outlet electrical adapters can be connected together by connecting the plug unit of said multi-outlet electrical adapter to the receptacle unit of another multi-outlet electrical adapter.

2. A multi-outlet electrical adapter as claimed in claim 1, wherein an arrangement of said electrical outlet relative to said plug unit in said multi-outlet adapter is different than an arrangement of said electrical outlet relative to said plug unit in said another multi-outlet electrical adapter, allowing computer peripheral equipment to be simultaneously plugged into said electrical outlet of said multi-outlet electrical adapter and said electrical outlet of said another multi-outlet electrical adapter when said plug unit of said multi-outlet electrical adapter is connected to the said receptacle unit of said another electrical adapter.

* * * * *